United States Patent
Park

(10) Patent No.: US 7,877,118 B2
(45) Date of Patent: Jan. 25, 2011

(54) MOBILE COMMUNICATION TERMINAL INCLUDING AN AROMATIC UNIT FOR EMANATING A FRAGRANCE

(75) Inventor: Mun-Hwa Park, Seoul (KR)

(73) Assignee: LG Electronics Inc., Seoul (KR)

( * ) Notice: Subject to any disclaimer, the term of this patent is extended or adjusted under 35 U.S.C. 154(b) by 979 days.

(21) Appl. No.: 11/689,345

(22) Filed: Mar. 21, 2007

(65) Prior Publication Data

US 2007/0223746 A1 Sep. 27, 2007

(30) Foreign Application Priority Data

Mar. 24, 2006 (KR) .................. 10-2006-0027174

(51) Int. Cl.
*H04M 1/00* (2006.01)
(52) U.S. Cl. .................. 455/575.1; 455/74; 455/556.1; 455/566; 455/575.3; 455/575.4
(58) Field of Classification Search .................. 455/74, 455/556.1, 566, 575.3, 575.4, 575.1
See application file for complete search history.

(56) References Cited

U.S. PATENT DOCUMENTS

| 2004/0162118 | A1* | 8/2004 | Park et al. ................. 455/575.1 |
| 2004/0198417 | A1* | 10/2004 | Yoda ........................ 455/550.1 |
| 2004/0203412 | A1* | 10/2004 | Greco et al. ............... 455/66.1 |
| 2004/0204043 | A1* | 10/2004 | Wang et al. ............... 455/556.1 |
| 2005/0227745 | A1* | 10/2005 | Chiang et al. ............. 455/575.1 |
| 2006/0291675 | A1* | 12/2006 | Liu et al. ..................... 381/177 |
| 2008/0192911 | A1* | 8/2008 | Seo ........................ 379/142.06 |
| 2009/0227300 | A1* | 9/2009 | Lee et al. .................. 455/575.4 |

* cited by examiner

*Primary Examiner*—Kamran Afshar
*Assistant Examiner*—Munsoon Choo
(74) *Attorney, Agent, or Firm*—Lee, Hong, Degerman, Kang & Waimey

(57) ABSTRACT

A mobile terminal includes a first body, a second body slidably mounted at the first body, and a fragrance emanating unit mounted at one of the first and second bodies and disposed at a portion close to a user's nose when the user performs call communication. A user can smell fragrance during call communication effectively.

9 Claims, 5 Drawing Sheets

MOBILE COMMUNICATION TERMINAL INCLUDING AN AROMATIC UNIT FOR EMANATING A FRAGRANCE

CROSS-REFERENCE TO RELATED APPLICATIONS

Pursuant to 35 U.S.C. §119(a), this application claims the benefit of earlier filing date and right of priority to Korean Application No. 27174/2006, filed on Mar. 24, 2006, the contents of which is hereby incorporated by reference herein in its entirety.

FIELD OF THE INVENTION

The present invention relates to a mobile terminal and, more particularly, to a mobile terminal capable of emanating fragrance.

DESCRIPTION OF THE RELATED ART

Mobile terminals are becoming increasingly smaller and lighter and capable of providing various functions to meet users' demands. Mobile terminals also tend to be multi-functional, having functions such as games, a satellite broadcast reception function and an MP3 function. Additionally, a mobile terminal has been developed that can emanate fragrance in order to provide a user with a pleasant smell while using the terminal.

Conventional mobile terminals that can emanate fragrance can be divided into a mobile terminal having a key button made of a material capable of emanating fragrance, a mobile terminal having a terminal case made of a material capable of emanating fragrance and a mobile terminal having member installed therein that is capable of emanating fragrance. However, the conventional mobile terminals that can emanate fragrance have a disadvantage in that fragrance is emanated regardless of whether the terminal is open or closed thereby wasting the aromatic material, which shortens the period during which fragrance can be emanated and degrades performance of the mobile terminal.

SUMMARY OF THE INVENTION

One object of the present invention is to provide a mobile terminal in which a fragrance emanating unit is installed at a portion of the mobile terminal that is positioned close to the nose of a user in order to allow the user effectively smell fragrance emanated from the fragrance emanating unit. Another object of the present invention is to provide a mobile terminal capable of reducing consumption of an aromatic material and extending a period during which fragrance may be emanated by emanating fragrance only when the mobile terminal is in use.

In one aspect of the present invention, a mobile communication terminal is provided. The terminal includes a first body, a second body coupled to the first body such that the second body may be moved relative to the first body and the mobile terminal has an open configuration and a closed configuration, a lower surface of the first body covering an upper surface of the second body in the closed configuration and an aromatic unit adapted to emanate fragrance and located on a portion of at least one of the first body and second body such that the aromatic unit is not exposed when the mobile terminal is in the closed configuration.

It is contemplated that the aromatic unit is located such that the aromatic unit is in close proximity to a user's nose when the terminal is in the open configuration and the user is using the terminal for call communication. It is further contemplated that the aromatic unit includes a pad including an aromatic material.

It is contemplated that the pad has a semi-circle shape. It is further contemplated that the aromatic unit is located at substantially a midpoint between left and right sides of the at least one of the first body and second body.

It is contemplated that the terminal further includes a groove formed on the surface of the at least one of the first body and second body and wherein the aromatic unit is disposed in the groove. It is further contemplated that the aromatic unit is exposed partially when the mobile terminal is in the open configuration.

It is contemplated that the aromatic unit is exposed completely when the mobile terminal is in the open configuration. It is further contemplated that the aromatic unit is adapted to be detachable from the at least one of the first body and second body.

It is contemplated that the aromatic unit includes a band disposed in a widthwise direction on a top surface of the second body. It is further contemplated that the aromatic unit is located on an upper surface of the second body and includes a sealing member adapted to receive an aromatic material and a fragrance-emanating member disposed inside the sealing member, wherein the sealing member forms a seal between the upper surface of the second body and a lower surface of the first body when the terminal is in the closed configuration.

It is contemplated that the sealing member includes an outer surface that protrudes from the upper surface of the second body with a certain height such that a space is formed within which the fragrance-emanating member is disposed. It is further contemplated that the sealing member includes an elastic material adapted to attach to the lower surface of the first body when the terminal is in the closed configuration.

It is contemplated that the fragrance-emanating member includes a pad including an aromatic material. It is further contemplated that the fragrance-emanating member is partially exposed when the terminal is in the open configuration. Preferably, the terminal is a folder-type, a slide-type or a swing-type.

In another aspect of the present invention, a mobile communication terminal is provided. The terminal includes a first body, a second body coupled to the first body such that the second body may be moved relative to the first body and the mobile terminal has an open configuration and a closed configuration, a lower surface of the first body covering an upper surface of the second body in the closed configuration and an aromatic unit adapted to emanate fragrance and formed as a band disposed in a widthwise direction on a bottom edge of the first body such that the aromatic unit is in close proximity to a user's nose when the terminal is in the open configuration and the user is using the terminal for call communication.

It is contemplated that the terminal further includes a groove formed on the surface of the bottom edge of the first body and wherein the aromatic unit is disposed in the groove. It is further contemplated that the aromatic unit is adapted to be detachable from the groove.

In another aspect of the present invention, a mobile communication terminal is provided. The terminal includes a first body, a second body coupled to the first body such that the second body may be moved relative to the first body and the mobile terminal has an open configuration and a closed configuration, a lower surface of the first body covering an upper surface of the second body in the closed configuration and an aromatic unit adapted to emanate fragrance and located on an upper surface of the second body such that the aromatic unit is exposed only when the mobile terminal is in the open configuration and the aromatic unit is in close proximity to a user's nose when the terminal is in the open configuration and the user is using the terminal for call communication.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1:
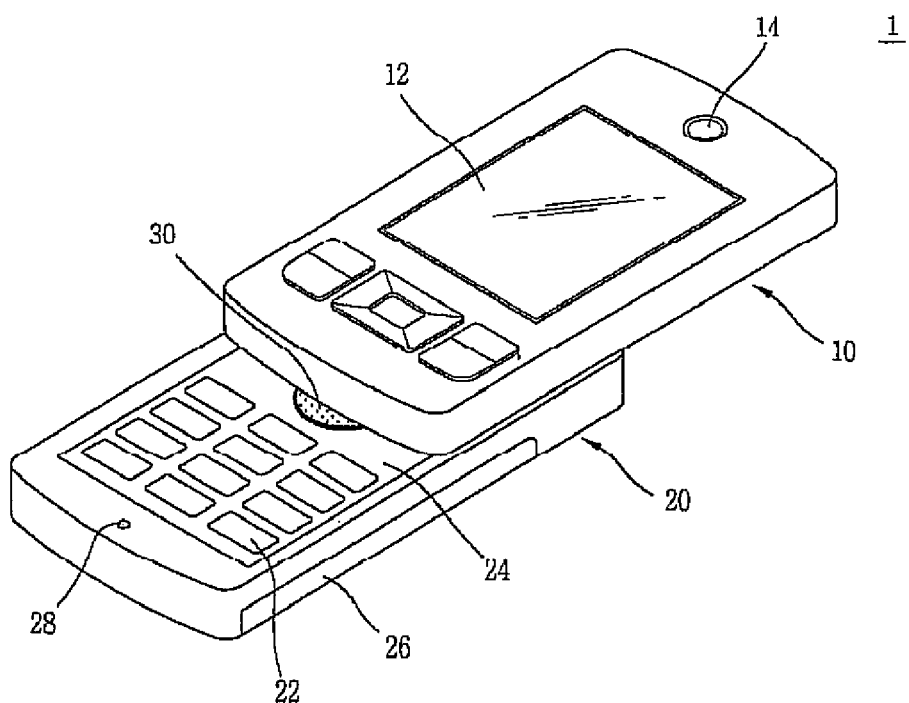
FIG. 1 is a perspective view of a mobile terminal according to a first embodiment of the present invention.
Figure 2:
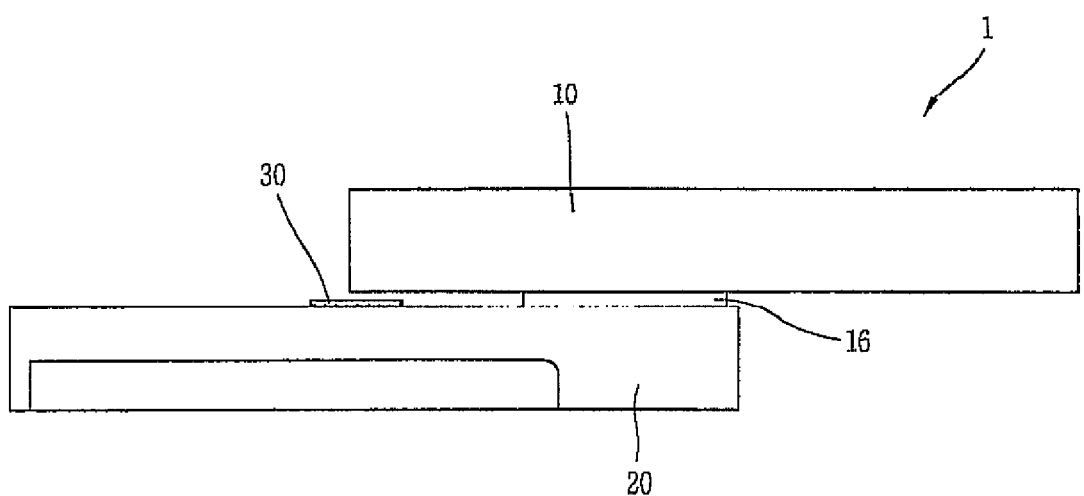
FIG. 2 is a side view of the mobile terminal according to the first embodiment of the present invention.
Figure 3:
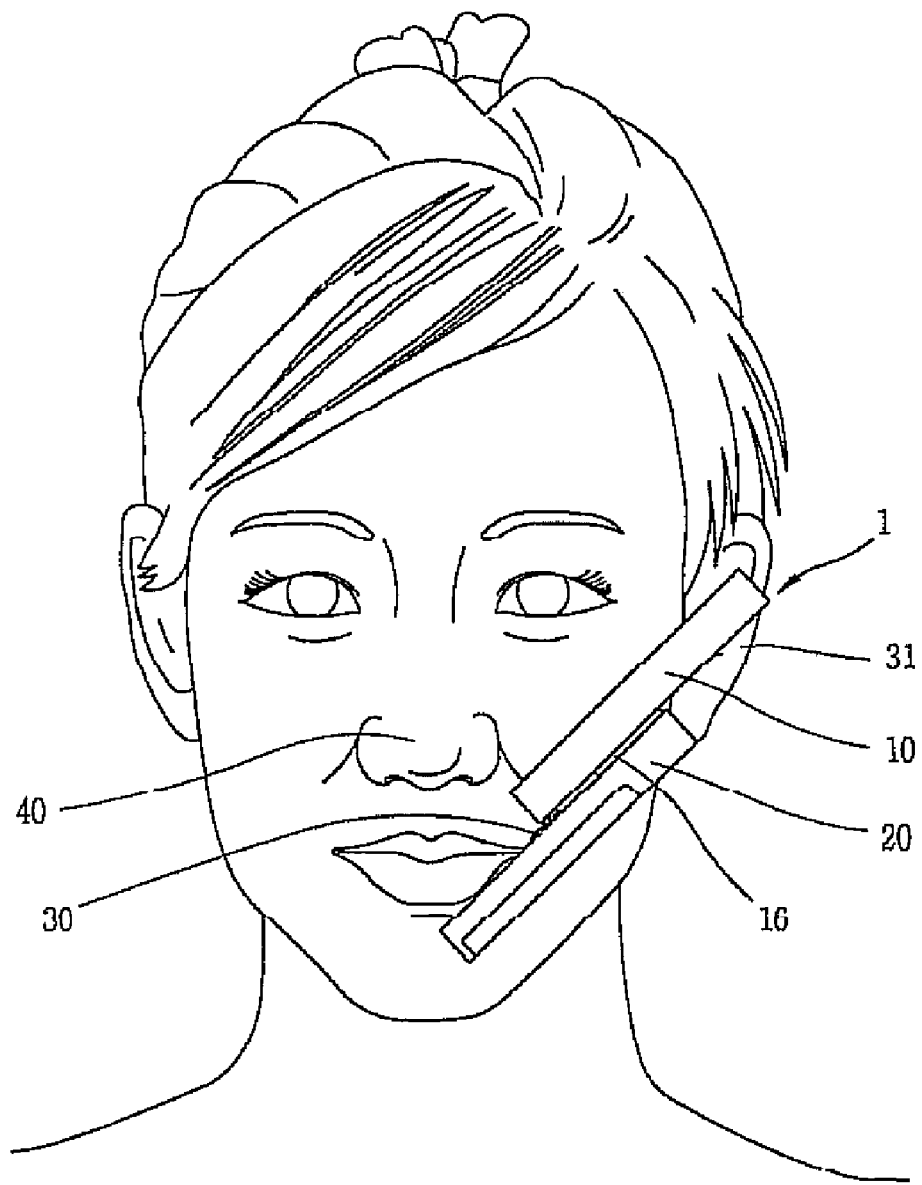
FIG. 3 is a view showing an operational state of the mobile terminal according to the first embodiment of the present invention.

The preferred embodiments of the present invention will be described with reference to the accompanying drawings. FIG. 1 is a perspective view of a mobile terminal 1 according to a first embodiment of the present invention. FIG. 2 is a side view of the mobile terminal 1 according to the first embodiment of the present invention. FIG. 3 is a view showing an operational state of the mobile terminal 1 according to the first embodiment of the present invention.

The mobile terminal 1 includes a first body 10 having a display 12 for displaying various information and a speaker 14 for outputting sound. A second body 20 is mounted at the first body 10 such that the second body can be slidably moved and has a keypad 24 with key buttons 22 formed on its front surface for allowing a user to input information and a battery 26 mounted at a rear surface. A fragrance emanating unit 30 is disposed at a position on at least the first body 10 or the second body 20 that is near the nose 40 of a user when the user performs call communication. A slide module 16 is installed between the first body 10 and second body 20 and facilitates the first body 10 sliding over the second body 20.

The second body 20 also includes a microphone 28 for receiving the user's voice during call communication. The keypad 24 can be integrally formed with the case of the second body 20 in order to have a key button region or the keypad can have push-type key buttons and be mounted on an upper surface of the case of the second body 20.

As illustrated in FIGS. 1-3, the fragrance emanating unit 30 is mounted at one side of the second body 20 which is close to the nose 40 of the user when the user slides the first body 10 in an opening direction and places the mobile terminal to his or her face for call communication. Because the fragrance emanating unit 30 is positioned such that it is close to the user's nose during call communication, the user can smell fragrance emanated from the fragrance emanating unit 30 effectively.

The fragrance emanating unit 30 can be attached on one side of the keypad 24 disposed on the second body 20 or can be integrally formed with the keypad 24 and have a pad containing a material capable of emanating fragrance or a pad including a fragrance emanating capsule. The fragrance emanating unit 30 can be mounted at a location on the front surface of the case of the second body 20, other than on the keypad 24, or can be insertedly disposed in a groove formed on the front surface of the case of the second body 20.

The fragrance emanating unit 30 can be positioned at any position as long as it is close to the user's nose when the user puts the mobile terminal near his or her face to perform call communication after sliding the first body 10 in the opening direction. Preferably, the fragrance emanating unit 30 is positioned at a midpoint between the left and right sides of the second body 20. Furthermore, the fragrance emanating unit 30 can be installed such that it is exposed either partially or entirely when the first body 10 is slid in the opening direction.

Specifically, the fragrance emanating unit 30 can be installed at the center of an upper side of the second body 20 such that when the first body 10 is slidably moved in a closing direction, the fragrance emanating unit is covered by the first body, and when the first body 10 is slidably moved in the opening direction, a portion of the fragrance emanating unit 30 is exposed to emanate fragrance. The fragrance emanating unit 30 is formed as a semi-circular pad such that it can be fixedly attached on the front surface of the keypad 24 or mounted in a groove formed on the upper surface of the case of the second body 24.

The fragrance emanating unit 30 can be detachably mounted on the second body 20 so that it can be replaced when completely used up. Specifically, the fragrance emanating unit 30 can be changed through an attachment/detachment process, and has a form that facilitates easy replacement. Any structure that facilitates replacement of the fragrance emanating unit 30 may be utilized.

In the mobile terminal according to the first embodiment, when the first body 10 is slid in the opening direction, the fragrance emanating unit 30 is exposed. When a user puts the mobile terminal near his or her face to perform call communication, the fragrance emanating unit 30 is near the user's nose, thereby allowing the user to smell the fragrance emanated from the fragrance emanating unit effectively.

Figure 4:
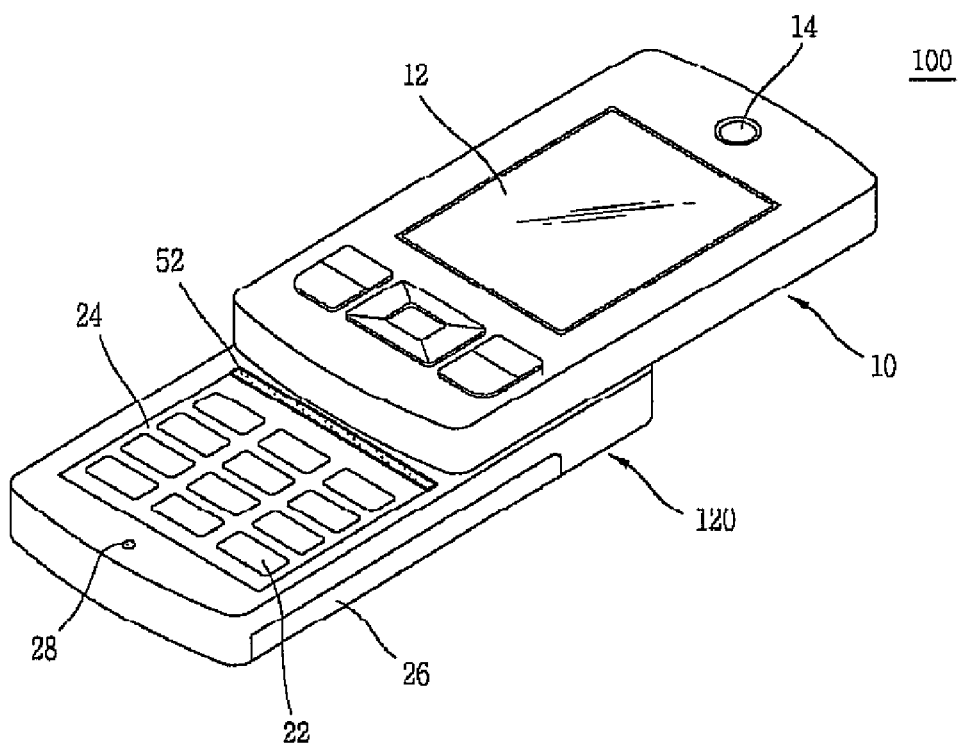
FIG. 4 is a perspective view of a mobile terminal according to a second embodiment of the present invention.

FIG. 4 is a perspective view of a mobile terminal 100 according to a second embodiment of the present invention. As illustrated in FIG. 4, a fragrance emanating unit 130 is formed as a band in a widthwise direction of the second body 120. Specifically, the fragrance emanating unit 130 is disposed in the widthwise direction of the keypad 24 mounted on the second body 120 or on an upper surface of the case of the second body that is close to the user's nose during call communication.

Similar to the fragrance emanating unit 30 in the first embodiment of the present invention, the fragrance emanating unit 130 of the second embodiment of the present invention has a pad and can be detachably mounted on the second body such that the fragrance emanating unit is replaceable. Because the fragrance emanating unit 130 is mounted in the widthwise direction of the second body 120, a minimum distance can be maintained between the fragrance emanating unit and the user's nose when the user puts the mobile terminal close to his or her face for call communication even when the position of the mobile terminal 100 is changed.

Figure 5:
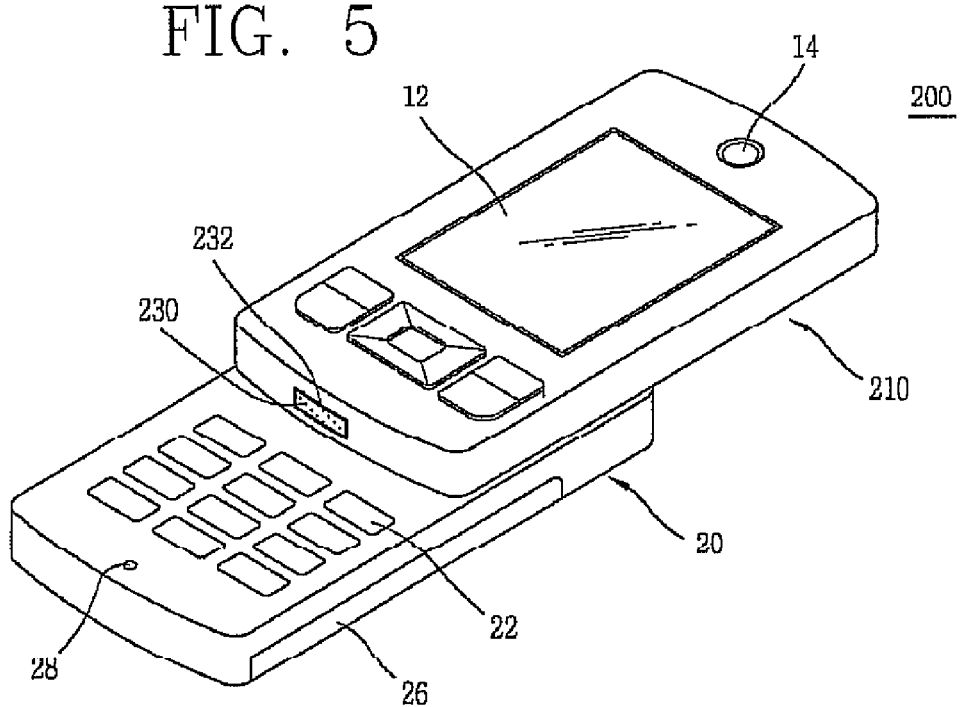
FIG. 5 is a perspective view of a mobile terminal according to a third embodiment of the present invention.

FIG. 5 is a perspective view of a mobile terminal 200 according to a third embodiment of the present invention. As illustrated in FIG. 5, the mobile terminal includes a fragrance emanating unit 230 mounted at a bottom edge of the first body 210.

In the third embodiment of the present invention, the fragrance emanating unit 230 is mounted at a bottom edge of the first body 210 in the widthwise direction. The bottom edge is near a user's nose 40 when the first body is moved in the opening direction for call communication. A groove 232 is formed in the widthwise direction at the lower edge of the first body 210 and the fragrance emanating unit 230 is inserted in the groove. In this way, the fragrance emanating unit 230 can be detachably mounted in the groove 232.

Figure 6:
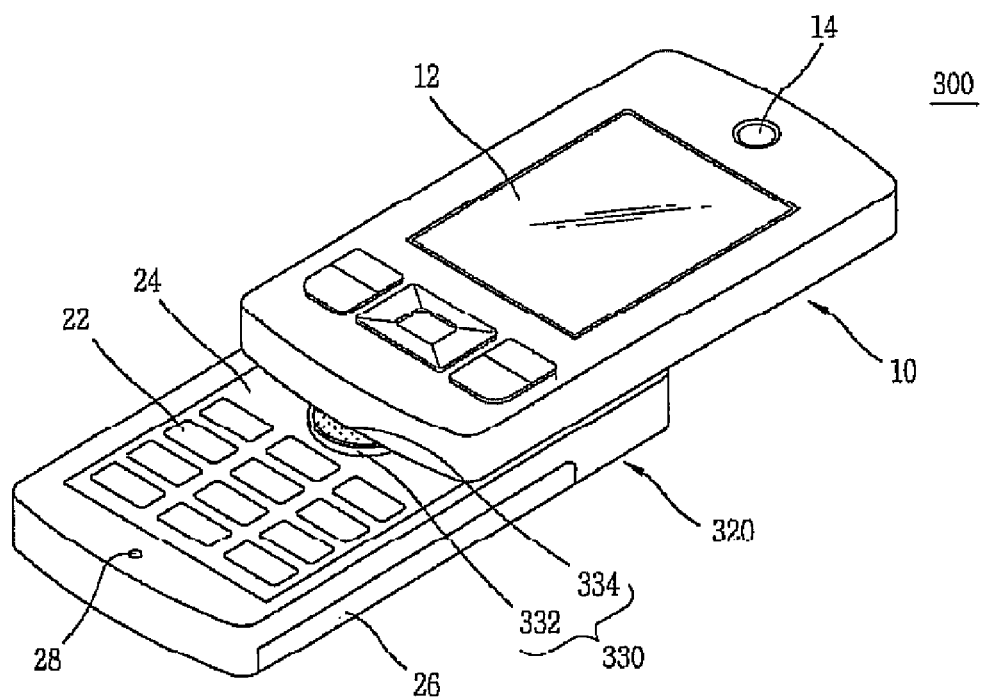
FIG. 6 is a perspective view of a mobile terminal according to a fourth embodiment of the present invention.
Figure 7:
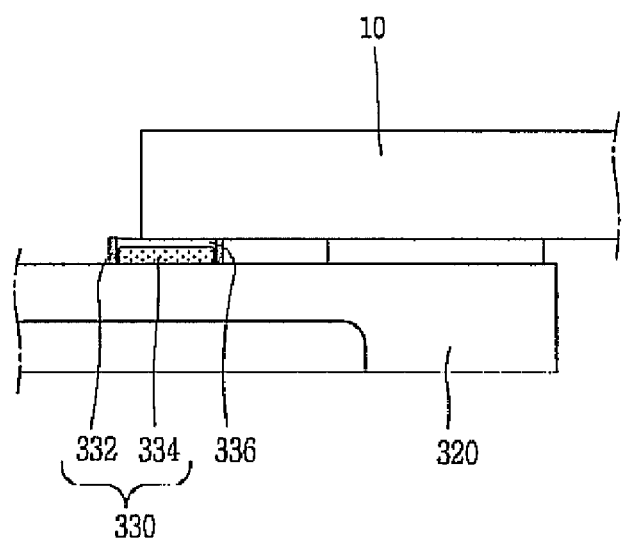
FIG. 7 is a sectional view of the mobile terminal according to the fourth embodiment of the present invention.
Figure 8:
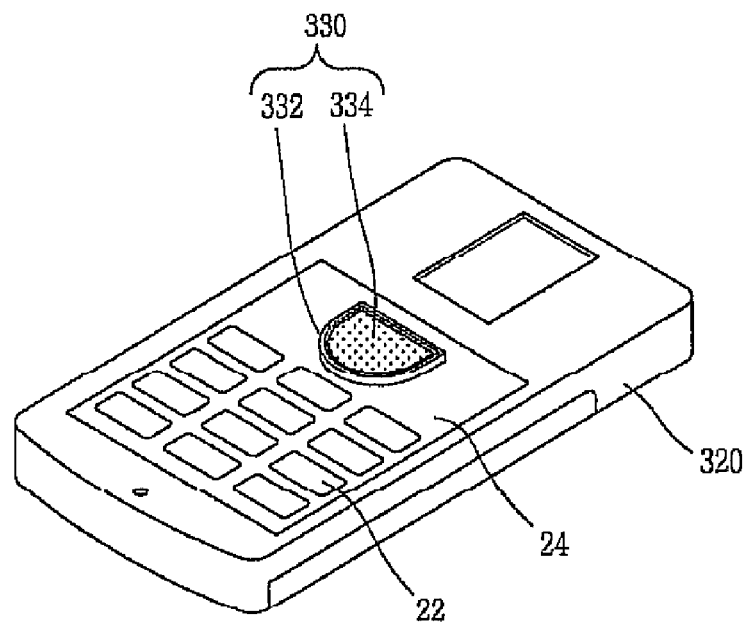
FIG. 8 is a perspective view of a second body of the mobile terminal according to the fourth embodiment of the present invention.
Figure 9:
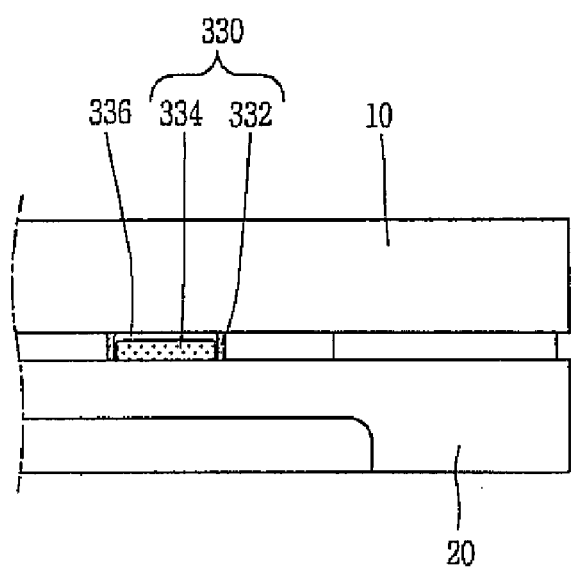
FIG. 9 is a view showing an operational state of the mobile terminal according to the fourth embodiment of the present invention.

FIG. 6 is a perspective view of a mobile terminal 300 according to a fourth embodiment of the present invention. FIG. 7 is a sectional view of the mobile terminal 300 according to the fourth embodiment of the present invention. FIG. 8 is a perspective view of a second body 320 of the mobile terminal 300 according to the fourth embodiment of the present invention. FIG. 9 is a view showing an operational state of the mobile terminal 300 according to the fourth embodiment of the present invention.

As illustrated in FIG. 6, a fragrance emanating unit 330 is mounted on the second body 320 such that it is near a user's nose 40 during call communication. When the first body 10 is slid in the opening direction, the fragrance emanating unit 330 emanates fragrance. The fragrance emanating unit 330 may also be provided on the first body 10, either in addition to or in place of the fragrance emanating unit provided on the second body 320.

The fragrance emanating unit 330 includes a sealing member 332 fixed on the keypad 24 on the upper surface of the second body 320 and is sealed when the mobile terminal 300 is in a closed state and is partially exposed when the mobile terminal is in an opened state. A fragrance emanating member 334 is received inside the sealing member 332 and emanates fragrance.

Preferably, the sealing member 332 has a space portion 336 therein, a circumferential surface protruded with a certain height and is formed in a container with its upper surface open. Preferably, the sealing member 332 is made of an elastic rubber material so that when the first body 10 is closed, the upper surface of the sealing member is attached to the lower surface of the first body 10 to thereby seal the interior of the fragrance emanating unit 330.

In this way, when the first body 10 is in the closed state, the upper surface of the sealing member 332 is tightly attached to the lower surface of the first body 10 to seal the interior of the sealing member. When the first body 10 is slid in the opening direction, a portion of the interior of the sealing member 332 is exposed.

Preferably, the fragrance emanating member 334 is formed as a pad including a fragrance generating capsule. The fragrance emanating member 334 may have any form, such as the pad or a gel, as long as it can emanate fragrance.

When the first body 10 is in a closed state, the upper surface of the sealing member 332 is tightly attached to the upper surface of the first body 10 such that the fragrance emanating in unit 330 is sealed. Accordingly, the fragrance emanating member 332 received inside the sealing member 332 is in a sealed state in order to prevent fragrance from emanating.

When the first body 10 is opened to use the mobile terminal, the first body 10 is slid over the second body 320 and a portion of the sealing member 332 that is fixed on the second body is exposed. In this state, when a user puts the mobile terminal 300 near his or her face, the fragrance emanating member 334 is close to the user's nose 40, thereby emanating fragrance such that the user can small the fragrance effectively.

When the mobile terminal 300 is in the closed state, the fragrance emanating member 334 is sealed by the sealing member 332 to prevent fragrance from being emanated externally. When the mobile terminal 300 is opened, the fragrance emanating member 334 is exposed to emanate fragrance externally.

Although described with respect to a slide type mobile terminal, the present invention may be applied to other types of mobile terminals. The fragrance emanating unit described above is also applicable to a folder type or a swing type mobile terminal.

Specifically, in a folder type mobile terminal, the fragrance emanating unit can be positioned on a portion of the terminal body that is close to a user's nose when the user opens the folder by rotating it about a hinge connection portion and puts it near his or her ear. One of the key buttons of a keypad mounted on the terminal body, such as a key button positioned on a portion of the keypad that is close to the user's nose when the mobile terminal is used, can be replaced with the fragrance emanating unit. Likewise, in a swing type mobile terminal where a first body is rotated in a swinging manner over a second body, the fragrance emanating unit can be positioned on a certain portion of the first body or the second body that is close to the user's nose when the user opens the first body in the swinging manner and puts it to his or her ear.

The mobile terminal according to the present invention has many advantages. When a user puts the mobile terminal near his or her face for call communication, the fragrance emanating unit is close to the user's nose such that the user can effectively smell the fragrance during call communication. Additionally, when the first body is in the closed state, the fragrance emanating member is prevented from emanating fragrance externally and when the first body is opened, the fragrance emanating member is partially exposed to emanate fragrance externally, thereby reducing waste of the fragrance emanating material and extending the period during which fragrance is emanated from the mobile terminal.

The foregoing embodiments and advantages are merely exemplary and are not to be construed as limiting the present invention. The present teaching can be readily applied to other types of apparatuses.

The description of the present invention is intended to be illustrative and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:
1. A mobile communication terminal comprising:
   a first body;
   a second body coupled to the first body such that the second body moves relative to the first body to configure the mobile communication terminal into an open configuration or a closed configuration, wherein a lower surface of the first body covers an upper surface of the second body when the mobile communication terminal is in the closed configuration; and an aromatic unit adapted to emanate a fragrance and positioned at a mounting location on the upper surface of the second body such that the aromatic unit is not exposed when the mobile communication terminal is in the closed configuration, wherein the aromatic unit comprises:
a sealing member comprising an elastic material and configured into a closed curve shape such that an interior is formed with an opening facing the lower surface of the first body in order to receive an aromatic material, and
a fragrance-emanating member comprising the aromatic material disposed inside the interior of the sealing member,
wherein the sealing member protrudes from the upper surface of the second body such that the lower surface of the first body presses the sealing member to seal the interior of the sealing member when the mobile communication terminal is in the closed configuration,
wherein the first body substantially overlaps the second body to cover the opening when the mobile communication terminal is in the closed configuration and the first body partially overlaps the second body to expose the opening when the mobile communication terminal is in the open configuration, and
wherein the aromatic unit is adapted to be detachable from the mounting location.

2. The mobile communication terminal of claim 1, wherein the aromatic unit is located on the second body relative to the first body such that the aromatic unit is in close proximity to a user's nose when the mobile communication terminal is in the open configuration and the user is using the mobile communication terminal for a call communication.

3. The mobile communication terminal of claim 1, wherein the aromatic unit is located at a midpoint that is substantially equidistant between left and right sides of at least one of the first body or second body.

4. The mobile communication terminal of claim 1, wherein the aromatic unit is exposed partially when the mobile communication terminal is in the open configuration.

5. The mobile communication terminal of claim 1, wherein the aromatic unit is exposed completely when the mobile communication terminal is in the open configuration.

6. The mobile communication terminal of claim 1, wherein the sealing member attaches to the lower surface of the first body when the mobile communication terminal is in the closed configuration.

7. The mobile communication terminal of claim 1, wherein the fragrance-emanating member comprises a pad including the aromatic material.

8. The mobile communication terminal of claim 1, wherein the fragrance-emanating member is partially exposed when the mobile communication terminal is in the open configuration.

9. The mobile communication terminal of claim 1, wherein the mobile communication terminal is a folder-type, a slide-type or a swing-type.

* * * * *